United States Patent [19]
Kinsley

[11] Patent Number: 4,562,760
[45] Date of Patent: Jan. 7, 1986

[54] TUBE NOTCHING APPARATUS

[75] Inventor: Robert J. Kinsley, Elmhurst, Ill.

[73] Assignee: Vogel Tool & Die Corp., Stone Park, Ill.

[21] Appl. No.: 427,720

[22] Filed: Sep. 29, 1982

[51] Int. Cl.$^4$ ............................................. B26D 1/12
[52] U.S. Cl. ....................................... 83/693; 83/917
[58] Field of Search .................. 83/917, 692, 693, 581, 83/191

[56] References Cited

U.S. PATENT DOCUMENTS

| | | | |
|---|---|---|---|
| 2,746,125 | 5/1956 | Cuny | 83/581 |
| 3,005,369 | 10/1961 | Koster | 83/191 |
| 3,073,195 | 1/1963 | Koster | 83/191 |
| 3,074,302 | 1/1963 | Coulon et al. | 83/191 |
| 4,194,422 | 3/1980 | Williams | 83/917 |

FOREIGN PATENT DOCUMENTS 545782  7/1956  Italy ...................................... 83/191

Primary Examiner—Donald R. Schran
Assistant Examiner—James Wolfe
Attorney, Agent, or Firm—Richard J. Myers & Assoc.

[57] ABSTRACT

Apparatus for cutting notches in the ends of tubing comprises an upright support and a horizontal base member. The upright support includes a ram guide and leverage mechanism for reciprocating a ram. The ram is provided at its lower terminal end with a cutting die which is initially positioned above the lower edge of the tube to be notched and moves through the tube during notching. The tube is supported on the base by means of an arcuate cradle or tube support, and the base includes adjustable mechanisms and stop means for varying the position of the tube support.

21 Claims, 5 Drawing Figures

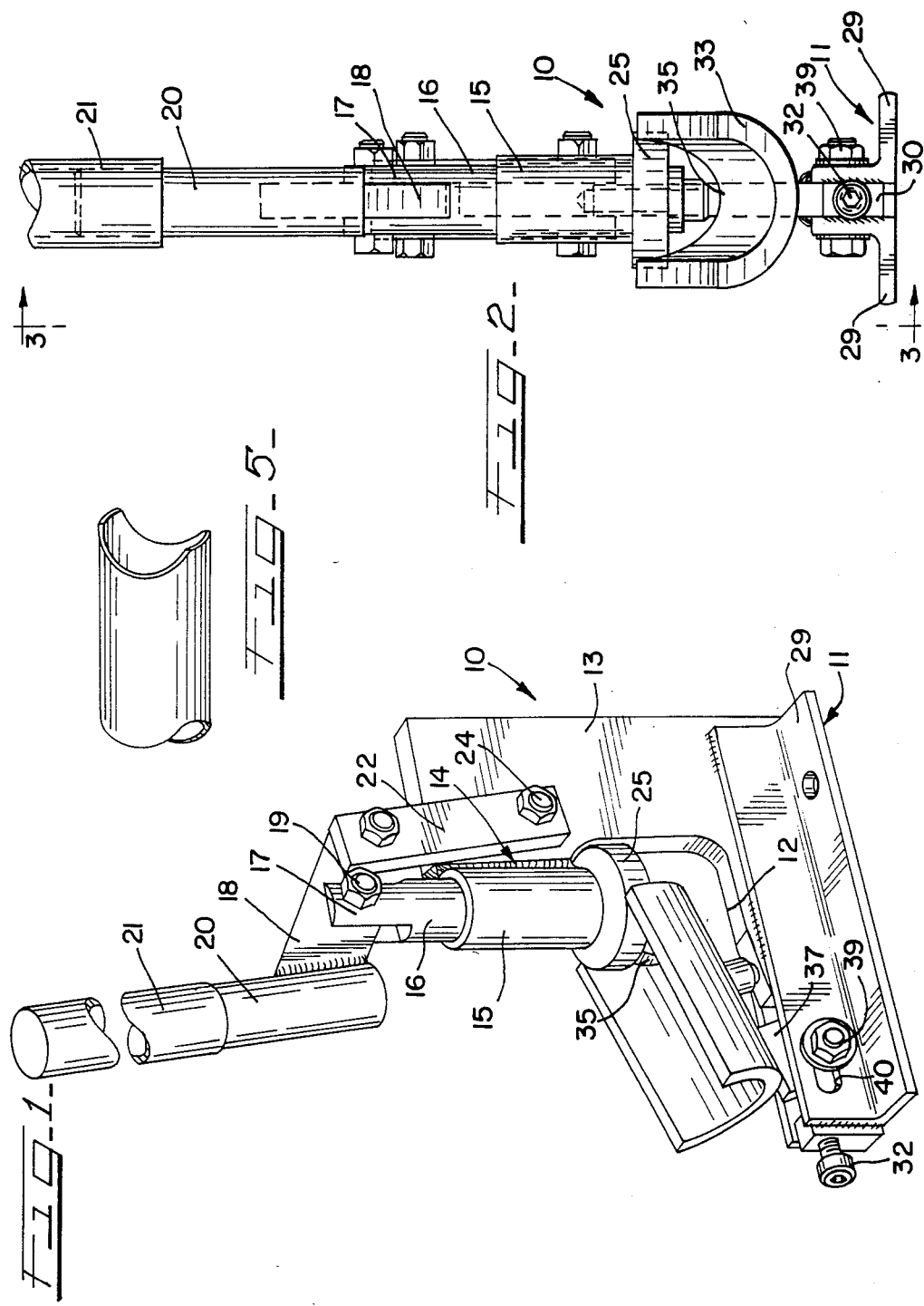

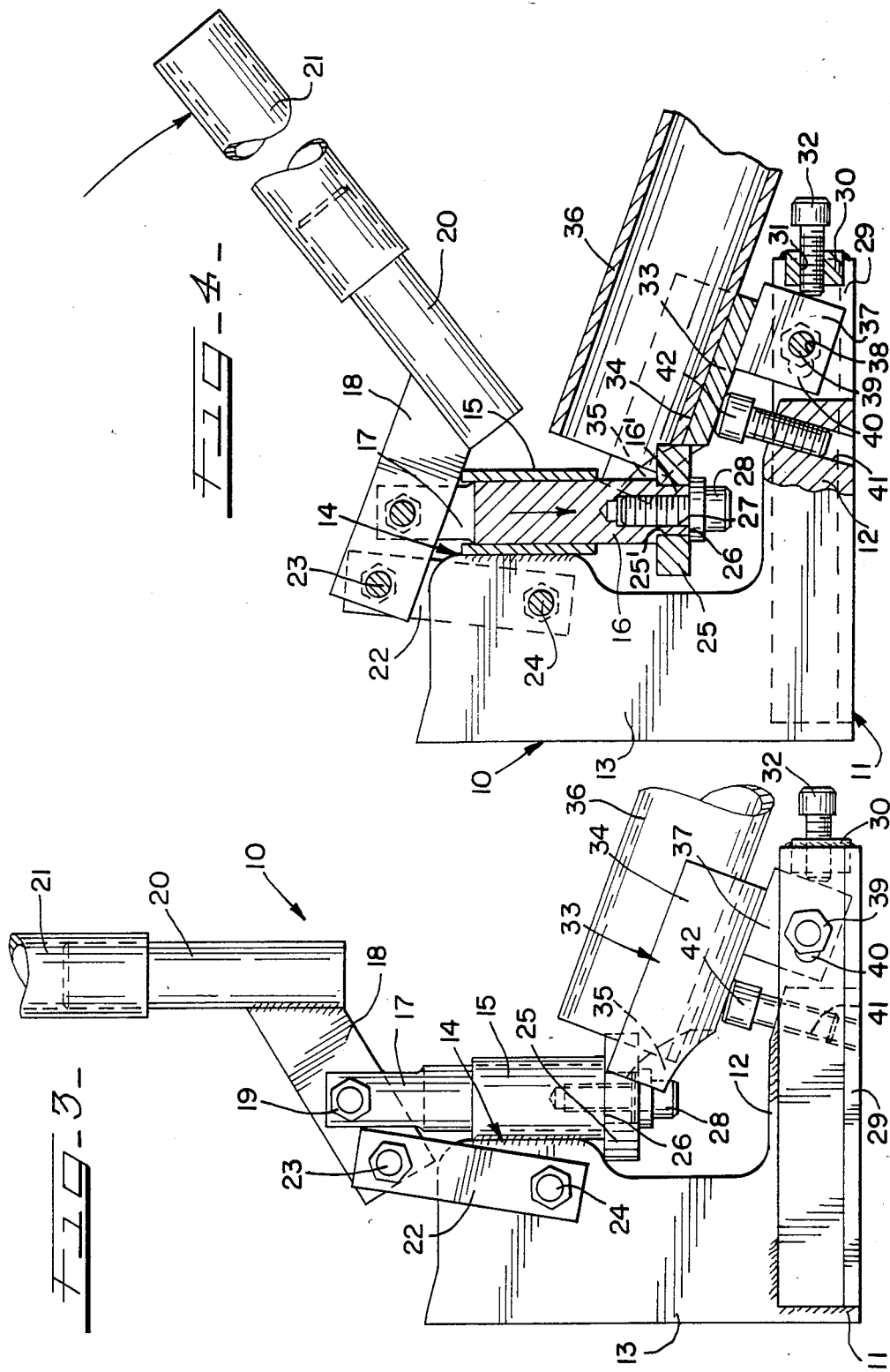

TUBE NOTCHING APPARATUS

BACKGROUND OF THE INVENTION

The utilization of tubing in structural applications requires that the tubing end be prepared by suitable notching elements so that it can be joined to another similar tube by either welding or brazing. Prior to the J. Vogel U.S. Pat. No. 2,126,519 Aug. 9, 1938, most of the tubular ends in structural applications were formed by either cutting out the notch by a flame cutter or by sawing. These methods were slow and uncertain and in most instances left an ill fitting notch which would have to be reworked. With the advent of the aforementioned patented method of the prior art, the preparation of tubular joints became greatly facilitated and various improvements have been made which includes prior art U.S. Pat. Nos. 3,073,195, 3,005,369, 3,033,066, 3,073,195, 3,074,302 all relating to improved apparatus for tubing notching. The present invention relates to an improved apparatus particularly suited to cut notches of a few different diameters in a tube utilizing a single cutting die wherein the cutting die is connected to the lower terminal end of a reciprocating ram. The cutting die shears the tube as it is supported in a tube support which includes improved adjustable elements operating to accommodate various cutting operations.

SUMMARY OF THE INVENTION

The present invention in summary comprises a tube notching apparatus which includes an upright pedestal which is supported as a base extending laterally of the pedestal which also includes a tubular ram guide. A vertically reciprocable ram is contained within the guide and is actuated by a suitable leverage mechanism. A cylindrical punch is connected to the lower flat terminal end of the ram and includes a quickly detachable disconnect member in the form of a cap screw. The base includes a tube support in the form of an arcuate section which is provided with an arcuate cutting edge at the end of the support immediately adjacent to a reciprocating cutter. Upon support of a tube to be cut in the tube support, the cutter, from a position above the tube end to be cut, moves downwardly through the tube end and arcuate cutting edge, thereby shearing out the notch to be desired. In order to vary the length of the notched cut, and to accomodate different sizes and thicknesses of tubing and pipe, it is desireable to adjust the position and inclination of the tube support and this is achieved by adjustment means on the base and locking devices which provide a fixed and immoveable support, for the purpose of restraining the tube support against movement.

BRIEF DESCRIPTION OF THE DRAWINGS

FIG. 1, is a perspective view of an improved tube notching apparatus;

FIG. 2, is an end elevational view of the apparatus disclosed in FIG. 1;

FIG. 3, is a side elevational view taken along the line 3—3 at FIG. 2,

FIG. 4, is a view similar to FIG. 3, having certain operating portions of the apparatus in sections and disclosing a step in the operation of notching the end of a tube, and FIG. 5, is a perspective view of a tube notched with the apparatus

DETAILED DESCRIPTION OF THE PREFERRED EMBODIMENT

An improved tubing notching Apparatus is generally designated at 10 in FIG. 1. The notcher apparatus 10 comprises a base 11 which extends horizontally and includes a foot portion 12 integral with a vertical upright plate or pedestal member 13 having a flat upright projection 14 which supports a tubular ram guide 15 welded thereto. A ram 16 at its upper end includes a bifurcated portion 17 which is connected to an arm 18 by means of a pivot bolt and nut assembly 19. The arm 18 is rigidly connected to a rod 20 which has removeably secured thereto a lever (pipe) 21. The arm 18 has an end portion pivotally connected to spaced links 22 by means of pivot bolt assemblies 23, the links 22 in turn being pivotally connected by pivot bolt assemblies 24 to the pedestal member 13.

A cylindrical notching cutter designated at 25 is removeably connected to the lower terminal end of the ram 16. The terminal end 16 is provided with a reduced diameter integral projection 16' provided at its lower end with a flat cylindrical surface portion 26 as best shown in FIG. 4. The flat surface portion 26 is formed integrally with the lower end of the ram 16 and is of a reduced diameter portion as indicated at 16'. The cutter 25 is provided with a vertical bore 25' securely seating the cutter 25 on the ram 16. The flat surface portion 26 and projection 16' are provided with a threaded bore 27 within which a cap screw 28 is secured. The projection 16' extends through a precisely machined opening of bore 25' and with the cap screw 28 securing the notching cutter on the projection 16' the cutter cannot be misaligned during notching of tubing end. Any twisting force is thus transmitted to the ram and therefore the cutter is maintained in proper straight alignment relative to the ram 16. Thus the projection 16' positively supports the cutter 25 against misalignment and no further support is required. The pedestal 13 is securely supported by a flat surface by means of angle members 29 which are welded to opposite lower ends of the foot 12 and pedestal 13.

The angle members 29 extend outwardly from the foot 12 and are welded together by means of a block and spacer 30 which includes a horizontal threaded bore 31 supporting a set screw 32.

A tube cradle or support is generally designated at 33 and includes an arcuate body portion 34 having a forwardly disposed arcuate cutting die portion 35, generally of the tube notch configuration which is desired. A tube 36 to be operated on is is shown supported in the tube support in FIGS. 3 and 4. The tube support includes a depending pivot member 37 which is provided with a transverse bore 38 supporting a bolt and nut assembly 39. The angle members 29 include slots 40 which permit longitudinal adjustment of the tube cradle 33 in relation to the cutter 25. As best shown in FIG. 4 the screw 32 engages the end of the pivot member 37 and securely locks the same against outward longitudinal movement which would otherwise occur during the notching of the tube. The foot 12 is provided with a tilted threaded bore 41 within which a cap screw 42 is positioned and which supports and regulates the angular position of the tube support 33.

THE OPERATION

In the operation the tube support 34 is adjusted to its desired angled position by raising or lowering the cap screw 42. The fore and aft positions of the tube support is dependent on the size cutter 25 and the wall size of the tubing to be notched. The fore and aft position is determined and the tube support is moved longitudinally to the position desired. The bolt and nut assembly 39 is tightened and the screw 32 is snugly screwed against the pivot member 37 which securely maintains the tube support against any longitudinal movement.

The tube is then placed into the cradle as indicated in FIG. 3, and the ram 17 and cutter 25 is moved downwardly co-acting with the arcuate cutting die portion 35 to notch the desired notch in the tubing end. The tube end is then rotated and the process is repeated whereupon the desired notch is formed in the tube.

It must be emphasized that the cutter 25 can be quickly changed by merely removing a single bolt 28 and can also be rotated to provide a fresh cutting edge by the single bolt adjustment By means of a single bolt adjustment member 42 the tube support 33 can be adjusted to raise and lower the angular position of the tube support. Similarly the longitudinal adjustment of the tube support can be achieved by the single bolt member 32 which actively prevents any longitudinal outward movement of the tube cradle during operation.

I claim:

1. Apparatus for notching the end portion of a tube comprising:
   an upright support including a base member,
   a singular tubular ram guide on said upright support,
   a ram member movably supported within said ram guide and having a lower terminal end portion spaced above said base member,
   leverage means movably connected to said ram member to said upright support for reciprocating said ram member,
   a notching punch carried by and reciprocally movable with said ram member,
   a tube support carried by said base member, said tube support providing cradle means for supporting an end of a tube,
   said tube support including a cutting die portion cooperative with the punch during movement of said ram and notching punch to shear an end portion of said tube,
   said terminal end portion and said punch having connecting means removably affixing the punch to the terminal end portion of the ram member,
   said punch and said connecting means defining with the base member a quick removal clearance space between the punch and connecting means above and the base member below to permit quick removal of the connecting means and punch from the terminal end portion of the ram member,
   said terminal end portion providing a greater removal space in a non-cutting position above the cutting die portion and a lesser removal space in the cutting position at the cutting die portion during notching.

2. The invention according to claim 1, and
   said connecting means including aperture means in the lower terminal end of said ram member, and
   the connecting means further including fastening means being removably secured within said aperture means for securing said notching punch to the terminal end of said ram member.

3. The invention according to claim 1, and
   means for positioning said tube support in a plurality of angled positions relative to said ram, and
   means for adjusting said tube support horizontally along said base member and stopping the same in one of a plurality of said horizontal positions.

4. The invention according to claim 1, and
   same ram member having a lower terminal end including reduced diameter portion and punch entrapping shoulder means, said punch being provided with aperture means receiving said reduced portion and being restrained between said shoulder means said connecting means.

5. Apparatus in accordance with claim 1, said tube support having adjusting means being adjustably supported on said base member whereby said cutting die portion may be angularly adjusted relative to said notching punch with the axis of the tube support being in the plane of movement of the punch and the cutting die portion being horizontally adjusted relative to the notching punch to adjust to different size tubes and punches.

6. Apparatus in accordance with claim 1, said base member extending transversely with respect to said tubular ram guide, and adjusting means on said base member and the tube support for adjustably positioning said tube support in a number of horizontally located positions relative to said notching punch.

7. Apparatus in accordance with claim 6, said adjusting means including a slot means cooperative with said base member and the tube support,
   securing means projecting through said slot means and connecting said tube support with said base member,
   and means on said base member horizontally movable for engaging said tube support to maintain the same in one of a plurality of said located horizontally spaced positions.

8. Apparatus in accordance with claim 7, said means horizontally movable comprising fastener means rotatably positioned on said base member and engaging a portion of said tube support.

9. Apparatus in accordance with claim 8, said tube support having depending pivot means receiving said securing means.

10. Apparatus in accordance with claim 8, said tube support having depending pivot means receiving said securing means, said pivot means being positioned in horizontally spaced relation between said vertical support element and said fastener means.

11. Apparatus in accordance with claim 1 and adjusting means including a vertical support element on said base member projecting upwardly with respect thereto and engaging said tube support, said support element being adjustable to support said tube support in a plurality of angled positions.

12. Apparatus in accordance with claim 1, including adjustable means on said base member engaging said tube support and being adjustable for securing the same in a plurality of angled positions, pivot means pivotally connecting said tube support to said base member for securing said tube support in a plurality of angled positions and adjustable stopping means limiting horizontal movement of said tube support relative to said base member.

13. Apparatus for notching the end portion of a tube comprising:
   an upright support including a base member;
   a tubular ram guide on the upright support;

a ram member movably supported within the ram guide;

leverage means connected to the ram member and to the upright support for reciprocating the ram member;

a notching punch supported on the ram member;

a tube support pivotally connected with the base member and providing cradle means for supporting an end of a tube;

the tube support having a cutting die portion adapted to coact with the notching punch to notch the end of the tube;

adjustment means supporting said tube support for adjusting the angle position of said tube support relative to said notching punch for optimal coacting of the cutting die portion with the notching punch for notching the end of the tube, said notching punch passing in a plane that passes through the axis of the tube support accommodate different size punches and tubes; and including adjustable means on said base member engaging said tube support and being adjustable for securing the same in a plurality of angled positions.

14. The invention according to claim 13, and said tube support having adjusting means being adjustably supported on said base member whereby said cutting die portion may be angularly relative to said notching punch with the axis of the tube support being in the plane of movement of the punch and the cutting die portion being horizontally adjusted relative to the notching punch to adjust to different size tubes and punches.

15. The invention according to claim 13, and said base member extending transversely with respect to said tubular ram guide, and adjusting means on said base member and the tube support for adjustably positioning said tube support in a number of horizontally fixed positions relative to said notching punch.

16. The invention according to claim 15, and said adjusting means including a slot means cooperative with said base member and the tube support, securing means projecting through said slot means and connecting said tube support with said base member, and means on said base member horizontally movable for engaging said tube support to maintain the same in one of a plurality of horizontally spaced positions.

17. The invention according to claim 13, and adjusting means including a vertical support element on said base member projecting upwardly with respect thereto and engaging said tube support, said support element being adjustable to support said tube support in a plurality of angled positions.

18. The invention according to claim 17, and said tube support having depending pivot means receiving said securing means, said pivot means being positioned in horizontally spaced relation between said vertical support element and said adjusting means.

19. The invention according to claim 13, and means for positioning said tube support in a plurality of angled positions relative to said ram, and means for adjusting said tube support along said base member and stopping the same in a plurality of positions there along position.

20. Apparatus for notching the end portion of a tube comprising:

an upright support including a base member;

a tubular ram guide on the upright support;

a ram member movably supported within the ram guide;

leverage means connected to the ram member and to the upright support for reciprocating the ram member;

a notching punch supported on the ram member;

a tube support pivotally connected with the base member and providing cradle means for supporting an end of a tube;

the tube support having a cutting die portion adapted to coact with the notching punch to notch the end of the tube;

adjustment means supporting said tube support for adjusting the angle position of said tube support relative to said notching punch for optimal coacting of the cutting die portion with the notching punch for notching the end of the tube, said notching punch passing in a plane that passes through the axis of the tube support accomodate different size punches and tubes;

said base member extending transversely with respect to said tubular ram guide, and adjusting means on said base member and the tube support adjustably positioning said tube support in a number of horizontal positions relative to said notching punch;

said adjusting means including a slot means cooperative with said base member and the tube support, securing means projecting through said slot means and connecting said tube support with said base member, and means on said base member horizontally movable for engaging said tube support to maintain the same in one of a plurality of horizontally spaced positions;

said means horizontally movable comprising fastener means rotatably positioned on said base member and engaging a portion of said tube support.

21. The invention according to claim 20, and said tube support having depending pivot means receiving said securing means.

* * * * *